United States Patent [19]
Kohlberg

[11] Patent Number: 5,502,444
[45] Date of Patent: Mar. 26, 1996

[54] METHOD AND APPARATUS FOR IMPROVING THE SIGNAL-TO-CLUTTER RATIO OF AN AIRBORNE EARTH PENETRATING RADAR

[75] Inventor: Ira Kohlberg, Alexandria, Va.

[73] Assignee: Mandex, Inc., Springfield, Va.

[21] Appl. No.: 311,674

[22] Filed: Sep. 23, 1994

[51] Int. Cl.⁶ .................................................. G01S 13/00
[52] U.S. Cl. .................................................. 342/22
[58] Field of Search ................................. 342/22, 118

[56] References Cited

U.S. PATENT DOCUMENTS

| | | | |
|---|---|---|---|
| 4,812,850 | 3/1989 | Gunton | 342/22 |
| 4,866,446 | 9/1989 | Hellsten | 342/25 |
| 4,896,116 | 1/1990 | Nagashima et al. | 324/329 |
| 4,905,008 | 2/1990 | Kawano et al. | 342/22 |
| 4,937,580 | 6/1990 | Wills | 342/22 |
| 5,057,846 | 10/1991 | Harmuth | 342/204 |
| 5,132,691 | 7/1992 | Hauschultz | 342/159 |
| 5,160,931 | 11/1992 | Brown | 342/25 |
| 5,247,302 | 9/1993 | Hughes | 342/22 |
| 5,339,080 | 8/1994 | Steinway et al. | 342/22 |

Primary Examiner—J. Woodrow Eldred
Attorney, Agent, or Firm—Richard C. Litman

[57] ABSTRACT

The method improves the signal-to-clutter ratio of an airborne earth penetrating radar for distinguishing subsurface objects from surface clutter or above-ground objects. The method relies on the dispersive response of the signals returned from an subsurface object to distinguish these subsurface signals from the non-dispersive response signals returned by surface clutter. The electromagnetic response from a subsurface object is spread out over time in comparison to the response from surface clutter. A correlation coincidence detection methodology discriminates surface clutter based on the temporal persistence of a subsurface object. The correlation procedure produces a sequence of values which are used as the basis for detection. If the radar pulses detect a subsurface object, the sequence of values persists beyond the interval of integration containing the clutter response.

10 Claims, 5 Drawing Sheets

METHOD AND APPARATUS FOR IMPROVING THE SIGNAL-TO-CLUTTER RATIO OF AN AIRBORNE EARTH PENETRATING RADAR

BACKGROUND OF THE INVENTION

1. Field of the Invention

The present invention relates generally to airborne earth penetrating radar, and more specifically to discriminating between underground objects and surface clutter objects by improving the signal-to-clutter ratio.

2. Description of the Prior Art

The detection, discrimination and identification of buried or subsurface objects is of interest for such uses as environmental range remediation, and the discernment of buried military facilities, unexploded ordinances, tunnels, and toxic wastes. The existence of such buried objects may be detected by the use of an earth penetrating radar ("EPR"), where a transmitted radiant signal is propagated into the ground. If an object is located underground, it will scatter the transmitted signal and reflect a return signal back to the radar for processing. A statistical decision process is employed to indicate the presence of an object based on the returned radar signal.

When an electromagnetic wave of radian frequency $\omega_o$ (where frequency $f_o = \omega_o/2\pi$) propagates into the ground, the wave experiences both attenuation and phase changes which generally depend on $\omega_o$ and the relative permittivity or dielectric constant ($\epsilon_r$), and conductivity ($\sigma$) of the earth. The attenuation of electromagnetic radiation in most types of soil rises with the frequency and with the water content of the soil. Frequency-dependent attenuation in the ground sets a limiting value of the effective bandwidth, which thereby limits the information content of a radar signal at a given noise or clutter level. Where the frequency is high enough, the attenuation is frequency independent while the phase change is proportional to $\omega_o$. A radar signal whose spectrum of frequencies is high enough to meet these conditions will not be dispersive. When a transmitted signal $S_T(t)$ is propagated into the ground from a surface platform, then the return signal $S_R(t)$ is defined by $$S_R(t) = A S_T(t - t_d)$$

where A is a time-independent parameter that depends on the radar signal waveform, ground constants, target cross section and range; $t_d$ is the round trip delay between the radar and the target. The contribution to the return signal from noise may be represented by adding the function $n(t)$ on the right side of the equation.

Existing earth penetrating radars are generally used for detecting objects buried at shallow depths of no more than one or two meters underground. These types of radar are often of the ground coupling type having a surface platform where the radar equipment is used at or near the ground surface. For shallow depths, earth penetrating radars of the ground coupling type operate in a frequency regime which is essentially dispersion-free. The close coupling between the radar and the ground has the effect of eliminating surface clutter, and of maximizing the electromagnetic coupling of the radar signal into the ground. This reactive coupling tends to focus the radar signal into the ground and reduce stray horizontal radiation. The return signal is a time-delayed replica of the transmitted signal $S_T(t)$. The mathematical structure of the return signal from the buried object is identical to the mathematical structure of the transmitted signal. However, this conventional type of radar detection generally will not be applicable for detecting more deeply buried objects where the environment is of a dispersive nature.

In addition, for a radar system utilizing an airborne platform, as shown in FIG. 1, the return signal would consist of not only the return from the buried object, but also the return signals from discrete objects situated along on the earth's surface. The return signal from the discrete objects is referred to as surface clutter, which provides a serious limitation on the ability of airborne radar to detect underground objects using conventional radar signal processing techniques. Returns from surface objects will generally have larger amplitudes than returns from buried objects, and returns from surface objects will also generally have the same signal shape. The signal-to-clutter ratio is small in this situation. Improved detection of objects against such unwanted returns from surface clutter may be achieved by improving the signal-to-clutter ratio of the radar system.

Various prior patents generally illustrating of the state of radar art, including the detection of underground objects, are listed below.

U.S. Pat. No. 5,247,302 issued to Michael S. Hughes on Sep. 21, 1993 describes an entropy-based signal receiver in which changes in received signals as a function of time are scrutinized. Hughes uses changes in the signal level or the signal structure to measure changes in the signal as a function of time or origin. However, Hughes does not measure whether the received signal is a delayed and attenuated signal version of the transmitted signal. Hughes posits that an entropy-based system improves detection of a signal scattered by inhomogeneities in a wave-propagating medium.

U.S. Pat. No. 5,160,931 issued to William M. Brown on Nov. 3, 1992 describes a synthetic aperture radar technique for detecting subsurface objects by cancelling surface echo returns. The radar platform moves perpendicular to a line through a pair of transducers. Both transducers receive return reflection signals. Subsurface objects are detected based on a determination of the complex phase factor in the absence of non-surface objects. The determined complex phase factor is used in cancelling the ground clutter.

U.S. Pat. No. 5,132,691 issued to Lars Hauschultz on Jul. 21, 1992 describes a radar system for recognizing useful signals superimposed with noise signals. A moving time window is used to recognize a useful signal if the duration of the signal exceeds a predetermined amplitude is larger than a predetermined minimum duration which is less than the duration of the time window.

U.S. Pat. No. 4,937,580 issued to Robert H. Wills on Jun. 26, 1990 describes a geophysical radar system producing a high resolution version of a received signal by cross-correlating the received signal.

U.S. Pat. No. 4,905,008 issued to Akio Kawano et al. on Feb. 27, 1990 describes an impulse radar system for detecting the presence of underground objects such as gas pipes. The system transmits a damped sinusoidal periodic wave. A standard time dependent amplification is used to amplify returns from shallow objects close to the surface, and deeper object returns are amplified by a larger amount to compensate for the attenuation due to travel through the earth. A constant amplitude is presented as the depth of the object increases.

U.S. Pat. No. 4,896,116 issued to Yuji Nagashima et al. on Jan. 23, 1990 describes a pulse radar system for distinguishing the echo wave of an underground object from a plurality of echo waves from surrounding objects. The returned signal is divided into portions for every time interval, and the divided signal portion is converted into a corresponding frequency region to obtain a spectral distribution. Spurious echo waves are eliminated based on the frequency region data obtained from the spectral distribution.

U.S. Pat. No. 4,866,446 issued to Hans O. Hellsten on Sep. 12, 1989 describes a coherent all radio band sensing system which can be used to map ice strata and other topographic and geologic structures. The system utilizes the concept of synthetic aperture radar (SAR).

U.S. Pat. No. 4,812,850 issued to David J. Gunton et al. on Mar. 14, 1989 describes a system for combining waveforms to suppress noise and clutter. A correlation operation is used in arriving at two product waveforms which are combined to produce data indicative of the presence of buried objects.

None of the above noted patents, taken either singly or in combination, disclose the arrangement of features in the instant invention for detecting underground objects from an airborne radar platform as disclosed in the present application.

SUMMARY OF THE INVENTION

A method and apparatus for improving the signal-to-clutter ratio of an airborne earth penetrating radar in a dispersive environment is disclosed. The method preferably comprises the steps of transmitting a radiant signal; receiving a returned reflection of the radiant signal, the returned reflection including a clutter response and a buried object response; dividing the returned reflection into time intervals; performing a correlation operation for the returned reflection to obtain a sequence of correlation voltages; determining the existence of correlation values in the sequence beyond the time interval containing the clutter response; and indicating the presence of the buried object based on the existence of correlation values beyond the time interval containing the clutter response.

The magnitude of the correlation voltages are compared with a minimum threshold value to determine whether the correlation voltage is above the threshold value to be used in determining the existence of a non-surface object. The minimum threshold value may correspond to a signal noise level. The time intervals containing the clutter response may be determined from a preliminary ranging operation.

Accordingly, an object of the present invention is to discriminate target objects buried in a dispersive ground from surface clutter using an airborne radar platform.

Another object of the present invention is to rely on the temporal persistence of the dispersive return signal from a buried target object to distinguish a target return from the return signal from surface clutter.

Another object of the present invention is to detect deeply buried objects from an airborne earth penetrating radar platform.

Yet another object of the present invention is to improve the signal-to-clutter ratio of an airborne earth penetrating radar by discriminating a dispersive return from a non-dispersive return.

These and other objects of the present invention will become readily apparent upon further review of the following specification and drawings.

BRIEF DESCRIPTION OF THE DRAWINGS

Similar reference characters denote corresponding features consistently throughout the several figures of the attached drawings.

DETAILED DESCRIPTION OF THE PREFERRED EMBODIMENTS

Figure 1:
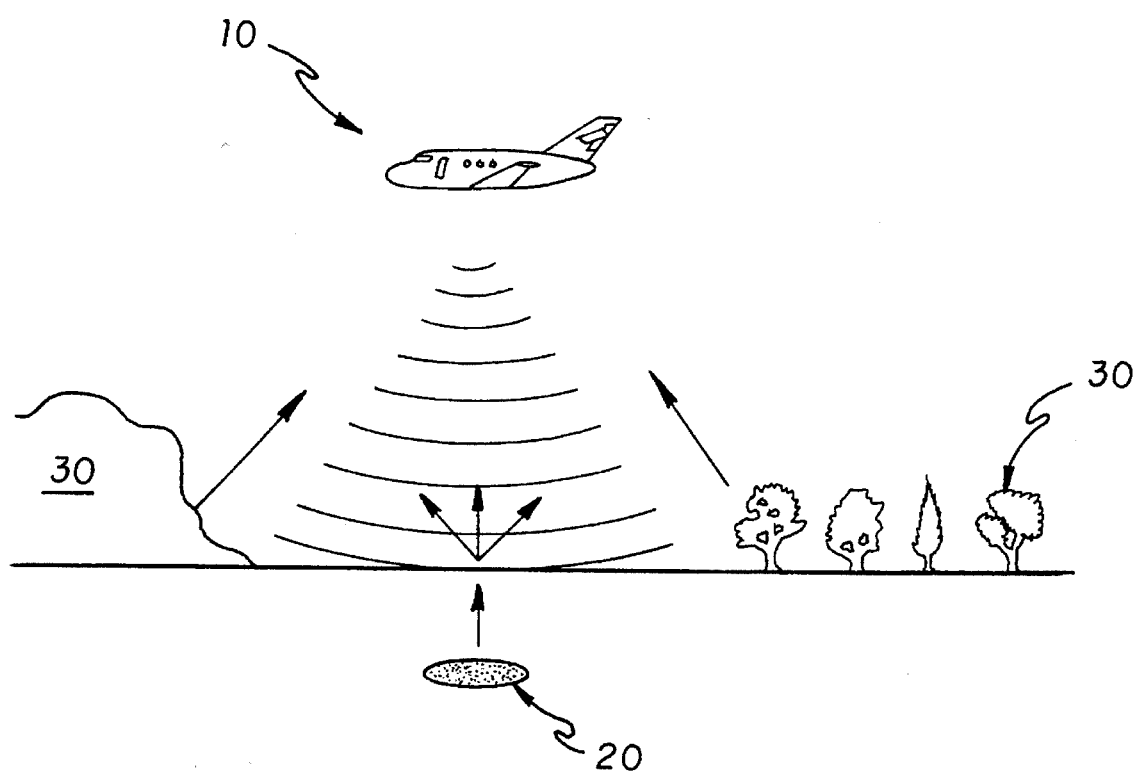
FIG. 1 is a side perspective view of an airborne platform earth penetrating radar used in a preferred embodiment of the present invention.

Referring now to the drawings, the present invention relates to an earth penetrating radar ("EPR") from an airborne platform such as aircraft, helicopters and tethered balloons. FIG. 1 shows an airplane acting as the airborne platform for the EPR. Using an EPR on a airborne platform has the advantages of rapid surveying by covering a larger area per unit time, safely covering hazardous areas such as weapon test ranges, and having a greater capability to use lower frequencies than surface platforms. An airborne platform can more easily transport larger antennas for producing radar signals having lower frequencies for deeper ground penetration.

When the electromagnetic wave from an airborne platform strikes the earth, a portion of the incident energy is reflected. The amount of reflected energy depends on the frequency of the radiant wave and the relative dielectric constant $\epsilon_r$ and conductivity $\sigma$ of the ground. An EPR for the dispersive regime requires a radar signal with a frequency that is lower than that used for shallow buried objects in a non-dispersive regime in order to reach deeply buried objects. Lower frequencies can propagate over a considerable distance in the ground without excessive attenuation for deeper ground penetration. Higher frequencies tend to be greatly attenuated over the same distance of propagation. For the dispersive case, the return signal will not be a replica of the transmitted wave, but will instead exhibit dispersive behavior. This dispersive behavior results from the fact that the attenuation is frequency dependent, and the phase delay is not proportional to the frequency. The dispersive nature of the ground response can cause wide variations in attenuation and phase response over frequency. The return waveform $S_B'$ from the buried target is governed by $$S_B' = \int_0^t \Gamma(t-t')S_T(t')dt'$$

where $S_T(t)$ is the transmitted waveform and $\Gamma(t-t')$ is a linear transfer function that accounts for the dispersive properties of the ground.

Figure 2A:
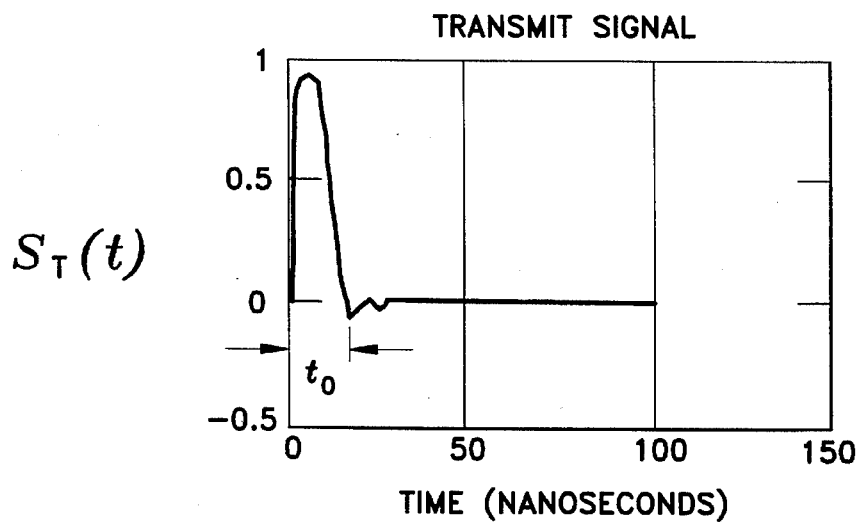
FIG. 2a is a graphical representation of the transmitted signal from a radar platform.
Figure 2B:
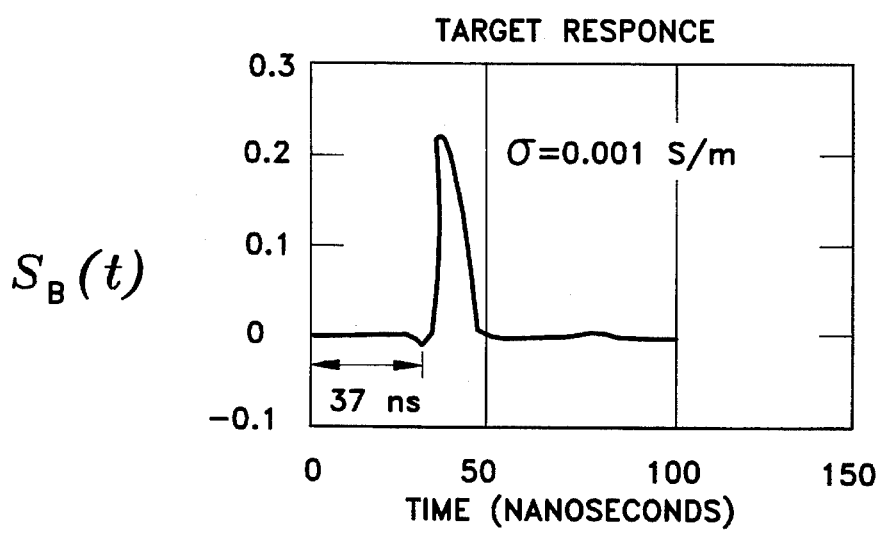
FIG. 2b is a graphical representation of the return response of the transmitted signal of FIG. 2a from a sample buried object in a dispersion-free case.
Figure 2C:
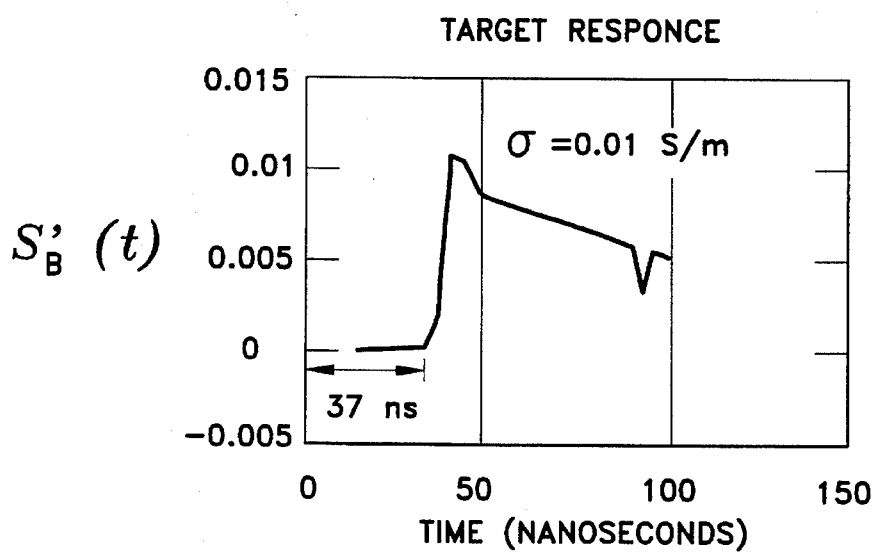
FIG. 2c is a graphical representation of the return response of the transmitted signal of FIG. 2a from a sample buried object in a dispersive case.

The illustrative graphs in FIGS. 2a, 2b and 2c show the effect of ground dispersion on the return signal for a sample subsurface object buried at 5 meters underground with an earth relative dielectric constant of $\epsilon_r=5$. The transmitted waveform of FIG. 2a has a pulse width of to =10 nanoseconds (ns). The magnitude scale of the response shown in FIGS. 2a and 2b is arbitrary and is not relevant to this discussion of the instant invention. FIG. 2b shows the return signal in a non-dispersive situation where $\sigma=0.001$ mhos/m and $\epsilon_r=5$. FIG. 2c shows the return in a dispersive regime having the same environmental parameters of $\sigma=0.001$ mhos/m and $\epsilon_r=5$. In both situations, the time delay was 37 ns. However, the return $S_B(t)$ shown in FIG. 2b is nearly a replica of the transmitted waveform $S_T(t)$, while the dispersive return $S_B'(t)$ shown in FIG. 2c is spread out over time. The temporal persistence of return $S_B'(t)$ is characteristic of dispersive responses in the propagation of waveforms.

The instant invention improves the signal-to-clutter ratio ("SCR") of airborne earth penetrating radar platforms by exploiting the dispersive nature of the return signal. Even though the dispersive return of FIG. 2c will generally have a small magnitude relative to an above-ground clutter return signal, the temporal persistence of the dispersive response will allow for the detection of the buried object. By relying on the temporal persistence of a dispersive return, SCR for buried targets is improved against discrete surface objects and clutter. The remainder of this discussion will assume that the return signal levels are suitably above the noise threshold to be useful.

Figure 3:
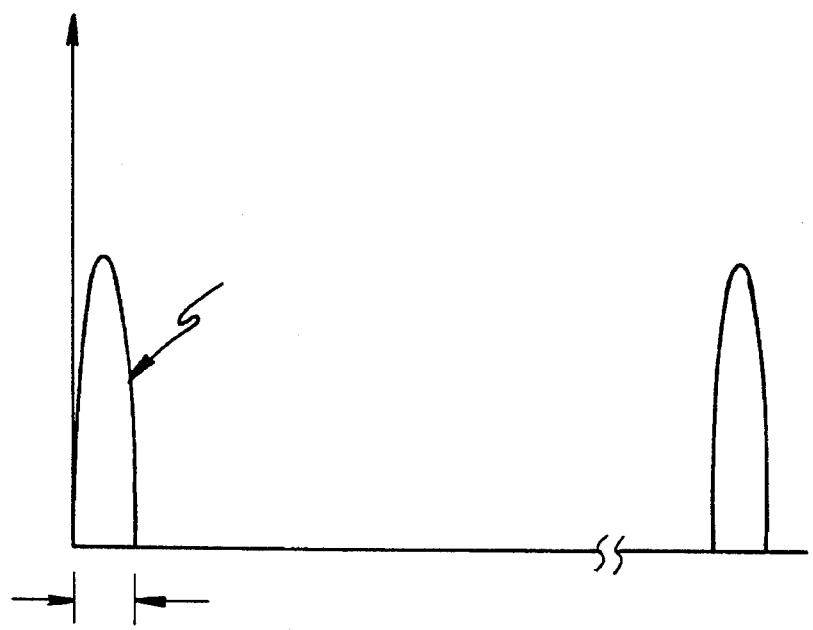
FIG. 3 is a graphical representation of the transmitted signal waveform.

The methodology of the instant invention for detecting buried objects where the propagation is dispersive will be referred to as Correlation Coincidence Detection. In the following model, the transmitted signal is a series of transmitted pulses as shown in FIG. 3. Each of these pulses is a half sine wave having a half period of $T_o$, with a pulse repetition period $T_R$. The ratio between the half period and pulse repetition period, where $T_R/T_o=N$, may be quite large.

A common time origin will be assumed for the return signals from the clutter and the buried target in the following discussion. However, it is noted that different time origins for the signals returned from the clutter and buried target can be compensated for by using appropriate radar processing techniques. In addition, other difficulties associated with radar systems, such as the effect of backscattering, can also be compensated for in the instant invention.

Figure 4:
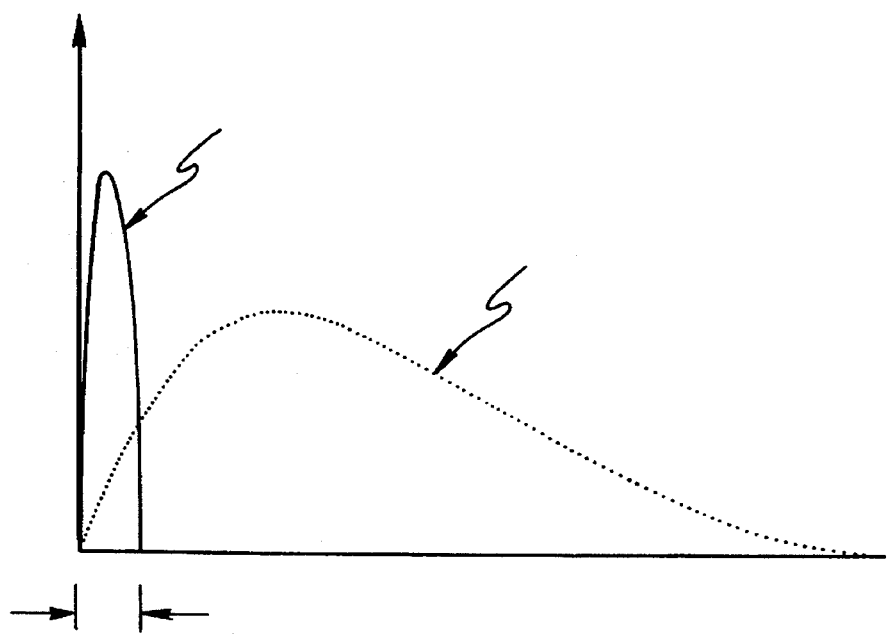
FIG. 4 is a graphical representation of the return signal response from surface clutter and buried objects in a dispersive regime.

FIG. 4 shows the resulting received waveform, where the total return signal includes both the clutter response and the buried target response, as represented by $$S_R(t)=S_C(t)+S_B(t)$$

The clutter response is given by $$S_C(t)=D\sin(\pi t/T_o)$$

where D is a range dependent constant. The response from the buried target is dispersive and is represented by $$S_B(t) = \int_0^t \Gamma(t-t')S_T(t')dt'$$

As noted earlier, the magnitude of the buried return is often much less than that for a surface target of similar size. If return target signal is less than the clutter return signal, then the return target signal will be masked by the clutter response if the round trip time delay for the clutter and target return signals lie in the same range bin.

The instant correlation technique can distinguish the dispersive target response $S_B(t)$ from the clutter response $S_C(t)$ by correlating the return response signal $S_R(t)$ with a replica of the transmitted signal. This replica, $$V_C=\alpha\sin(\pi t/T_o)$$

where $\alpha$ is an arbitrary constant, is correlated with $S_R(t)$ in this initial correlation process to yield the following equation, $$\int_0^{T_o} V_C(t)S_R(t)dt = \alpha D \int_0^{T_o} \sin^2(\pi t/T_o)dt + \alpha \int_0^{T_o} \sin(\pi t/T_o)S_B(t)dt$$

The first term on the right side of the equation integrates to $\alpha D T_o/2$ to represent the clutter response. The second term integrates to another value to represent the dispersive response, which will be referred to as $$V_1 = \int_0^{T_o} \sin(\pi t/T_o)S_B(t)dt$$

In the situation shown in FIG. 4, where the clutter signal, $\alpha DT_o/2$, is greater than the dispersive signal, $V_1$, it would not be possible to discern the buried target without further processing.

Therefore, the correlation process is reiterated over the next period from $T_o$ to $2T_o$. In this instance, there will be no contribution to the correlation by the clutter signal because the clutter signal is not present in this interval. The resulting equation is as follows:

$$\int_{T_o}^{2T_o} V_C(t-T_o)S_R(t)dt = V_2 = \alpha \int_{T_o}^{2T_o} \sin(\pi t/T_o)S_B(t)dt$$

This correlation process can be continued over a large number of m sequences if the half period $T_o$ of the radar signal is much less than the characteristic spreading of the dispersive ground response. The value m represents the number of sequences or intervals of integrations that may be performed by the correlation operation. The maximum number of sequences is the ratio N of the pulse repetition period $T_R$ over the pulse period $T_o$. This correlation procedure results in the following sequence of values:

$$V_k = \int_{(k-1)T_o}^{kT_o} \sin\frac{\pi(t-(k-1)T_o)}{T_o} S_B(t)dt$$

and m represents the last interval of integration for the sequence (i.e., $V_m$), where m is less than or equal to N. The above sequence of values is used as a basis of detection, provided that the values lie above the noise threshold. Should the useful sequence of correlated values persist beyond the intervals in which clutter is present, then an indication of the presence of the buried object is displayed.

The correlation coincidence detection technique produces a sequence of values over several intervals of integration. A preferred method of performing the correlation coincidence technique is set forth below. First, the correlation voltage, $W_k$, of the returned radar signal is computed using the Kronecker delta function, $\delta_{k1}$, as follows:

$$W_k = \alpha \int_{(k-1)T_o}^{kT_o} \sin \frac{\pi(t-(k-1)T_o)}{T_o} S_B(t)dt$$
$$= (\alpha T_o D/2)\delta_{k1} + V_k$$

The Kronecker delta function $\delta_{k1}=1$ for k=1; $\delta_{k1}=0$ otherwise. It is noted that k may be greater than one where there are clutter contributions past the first interval. For intervals where there are no clutter contributions, detection of the dispersive signal may be possible.

Next, the magnitude $U_k$ of the correlation voltage $W_k$ is computed as follows: $U_k=|W_k|$. This ensures a positive number for comparison with a threshold value (i.e., $U_k \geq 0$). If the magnitude $U_k$ of the correlation voltage is greater than a minimum threshold value, $U_{min}$, the value of $U_k$ is set equal to one. Otherwise the magnitude $U_k$ of the correlation voltage is set equal to zero. Preferably, the minimum threshold value will be set to represent the signal noise for the system. Only signals whose magnitude are suitably above the noise threshold are used in the instant method.

A sequence is then formed, $\eta=U_1U_2...U_m$, where $1<m\leq N$. As stated earlier, N is the ratio of the pulse period $T_o$ over the pulse repetition period $T_R$, and represents the maximum number of intervals of integration. $\eta$ will have the value of 0 or 1 based on the magnitudes of the correlation voltage. If there is no buried target, then the values of $U_2$, $U_3$, ..., $U_m$ will be zero. If there is a buried target, then there will be contributions from the correlation values beyond the first interval of integration. If the clutter return extends over two intervals of integration instead of one, the technique still applies provided that m is greater than two. The extent of the clutter return may be predetermined by a radar ranging technique.

Figure 5:
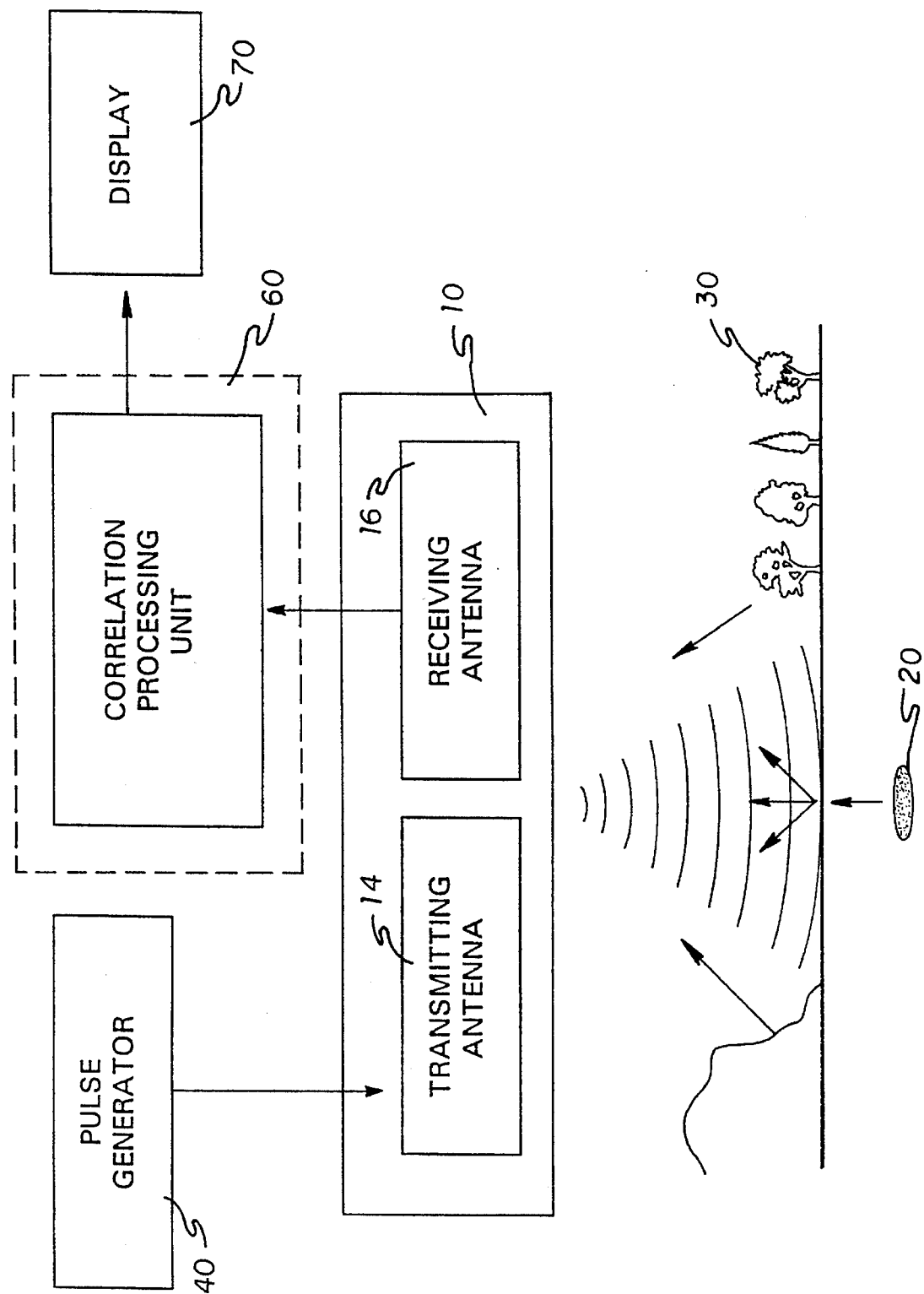
FIG. 5 is a block diagram of the airborne earth penetrating radar system according to the instant invention.

A block diagram of the airborne radar system is shown in FIG. 5. Radar antenna 10 is preferably a wide band antenna capable of transmitting 14 and receiving 16 wide band pulses. A distributive resistance antenna, such as a thin film V-monopole antenna, is suitable for radar antenna 10. Pulse generator 40 preferably generates wide band pulses in the range from 10 megahertz to 1 gigahertz. The selected frequency will depend on a variety of environmental factors, including the conductivity of the soil and the depth of the buried object, and may extend beyond the above given range. The received return signals are processed by the correlation coincidence detection unit 60 to produce a sequence of values over a predetermined set of time intervals. If the correlation coincidence detection unit 60 detects contributions above a minimum threshold value, such as the ambient noise level, past the time intervals containing the clutter response, then the display indicated the presence of a buried object.

Figure 6:
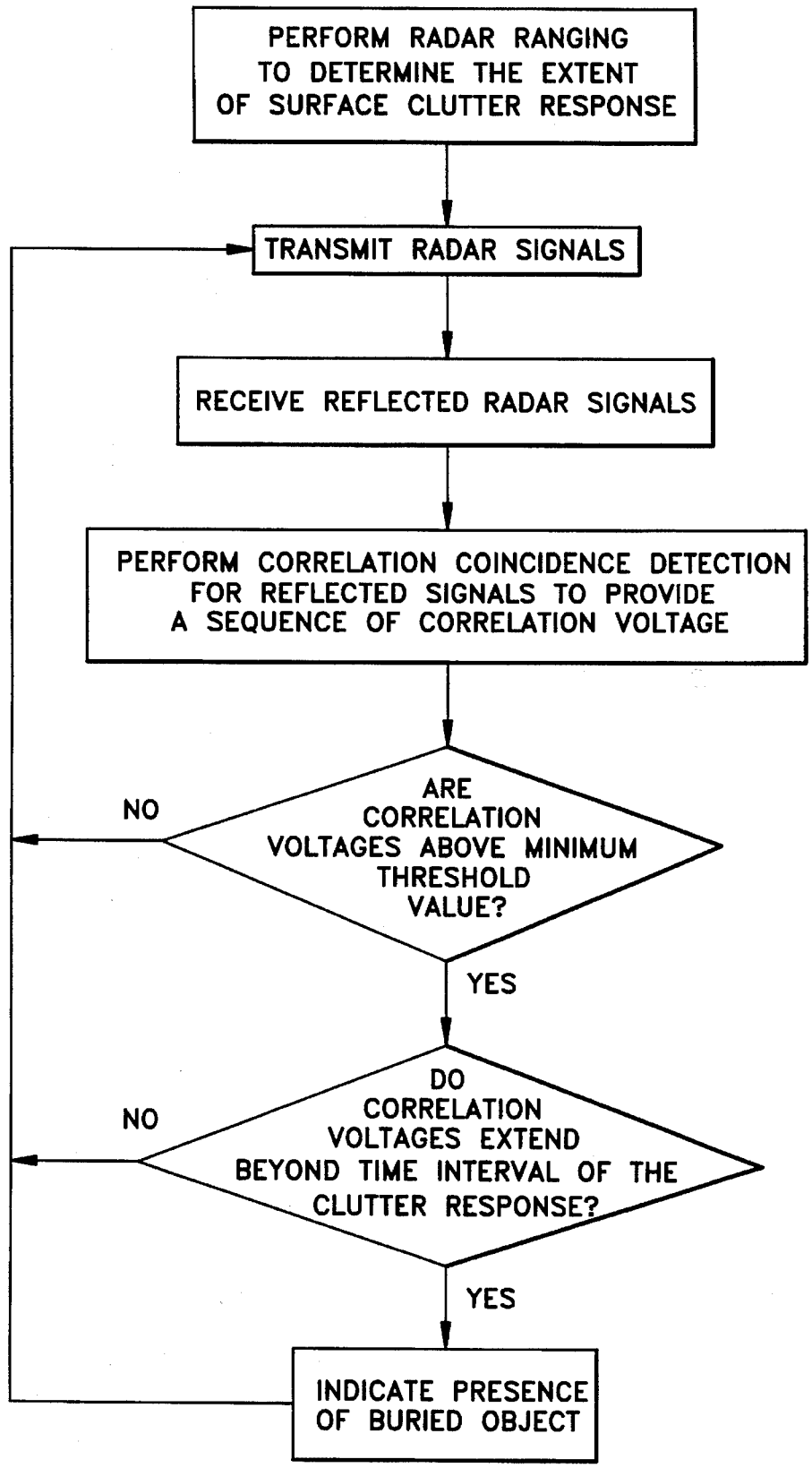
FIG. 6 is a flow chart describing the correlation coincidence detection of the airborne earth penetrating radar system according to the instant invention.

FIG. 6 is a flow chart describing the correlation detection technique of the instant airborne earth penetrating radar system. The extent of the clutter response is determined through a radar ranging technique. A periodic radar signal sample is sent out, and the returned reflected signal is measured for the time extent of the clutter response. The time extent, i.e., the number of time intervals containing the clutter response, is stored for later use in the correlation coincidence detection technique.

To detect buried target objects, a relatively low frequency radar signal is transmitted, and the corresponding return reflections are received by the radar antenna. Correlation voltages are calculated over each time interval of the reflected signals using the correlation coincidence detection technique. The calculation preferably uses a Kronecker delta function as described earlier. The magnitude of the correlation voltage is compared with a minimum threshold value to determine the usefulness of the computed correlation values. If the correlation voltage is above the predetermined threshold value, and if the correlation voltages indicate contributions persisting beyond the time intervals known to contain the clutter response, then the presence of a buried object is indicated and displayed.

It is to be understood that the instant invention is not limited to the exemplary embodiments described above. The instant invention can be used to detect any object laid beneath a dispersive medium. It will be apparent to those skilled in the art that various modifications and variations are possible within the spirit and scope of the instant invention. For instance, spurious contributions due to noise can be offset using conventional radar processing techniques. The instant invention encompasses any and all embodiments within the scope of the following claims.

I claim:

1. A method of detecting a subsurface object buried in a dispersive environment comprising the steps of:

transmitting a radiant signal;

receiving a returned reflection of the radiant signal, the returned reflection including a clutter response and a buried object response;

dividing the returned reflection into time intervals;

performing a correlation operation for the returned reflection to obtain a sequence of correlation voltages;

determining the existence of correlation values in the sequence beyond the time interval containing the clutter response;

indicating the presence of the buried object based on the existence of correlation values beyond the time interval containing the clutter response.

2. The method of claim 1, wherein the step of performing a correlation operation further includes the steps of:

computing the magnitude of the correlation voltage; and comparing the magnitude of the correlation voltages with a minimum threshold value to determine whether the correlation voltage is above the threshold value to be used in determining the existence of a non-surface object.

3. The method of claim 1, wherein the minimum threshold value corresponds to a signal noise level.

4. The method of claim 1, wherein the transmitted radiant signal has a frequency low enough to reach the subsurface object in the dispersive environment.

5. The method of claim 1 further comprising the step of determining the time intervals containing the clutter response from a ranging operation.

6. The method of claim 1 wherein the radiant signal is transmitted and received by an airborne radar platform.

7. A radar system for detecting non-surface objects comprising:

a transmitting antenna emitting radiant signals;

a receiving antenna receiving return signals reflected from a non-surface object and clutter;

a correlation processing unit dividing the returned reflection into time intervals, performing a correlation operation for the returned reflection to obtain a sequence of correlation voltages, and determining the existence of correlation values in the sequence beyond the time interval containing the clutter response; said correlation processing unit producing a first detection signal when the existence of correlation values is detected beyond the time intervals containing the clutter response; and a display indicating the presence of the non-surface object based on said first detection signal from said correlation processing unit.

8. The radar system of claim 7, wherein said correlation processing unit uses a Kronecker delta function in the correlation operation.

9. The radar system of claim 7, wherein said correlation processing unit computes the magnitude of the correlation voltage; and compares the magnitude of the correlation voltages with a minimum threshold value to determine whether the correlation voltage is above the threshold value to be used in determining the existence of a non-surface object.

10. The radar system of claim 7, wherein said transmitting antenna is an airborne earth penetrating radar platform.

* * * * *